(No Model.)

J. C. HURST.
FEED RACK.

No. 445,221.  Patented Jan. 27, 1891.

2 Sheets—Sheet 1.

Witnesses
T. G. Fischer
Theo. J. Fischer

Inventor
John C. Hurst
By his Attorney
L. Deane (No Model.)

J. C. HURST.
FEED RACK.

No. 445,221.

2 Sheets—Sheet 2.

Patented Jan. 27, 1891.

Witnesses
F. J. Fischer
Theo. J. Fischer

Inventor
John C. Hurst
By his Attorney
L. Deane

UNITED STATES PATENT OFFICE.

JOHN C. HURST, OF HOLTON, KANSAS.

FEED-RACK.

SPECIFICATION forming part of Letters Patent No. 445,221, dated January 27, 1891.

Application filed September 27, 1886. Serial No. 214,642. (No model.)

*To all whom it may concern:*

Be it known I, JOHN C. HURST, a citizen of the United States, residing at Holton, in the county of Jackson and State of Kansas, have invented certain new and useful Improvements in Feed-Racks, of which the following is a specification, reference being had therein to the accompanying drawings.

Figure 1:
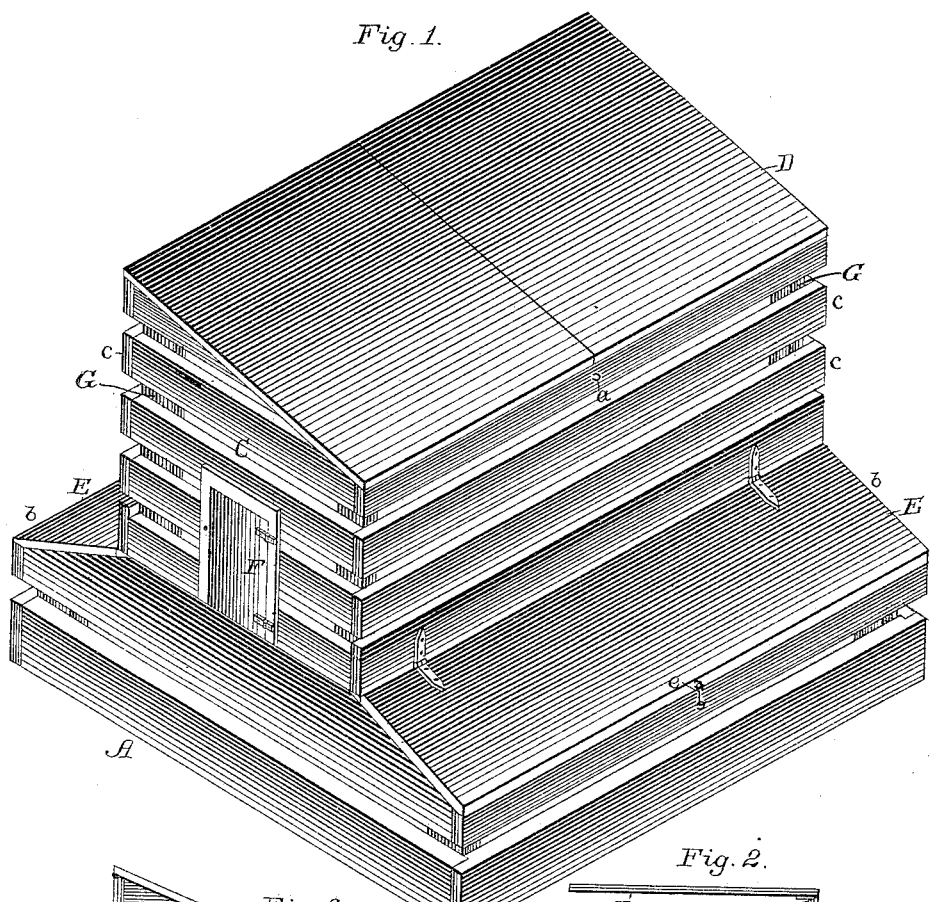
Figure 3:
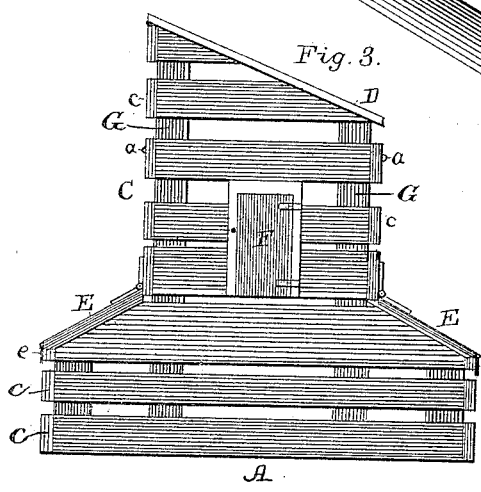
Figure 2:
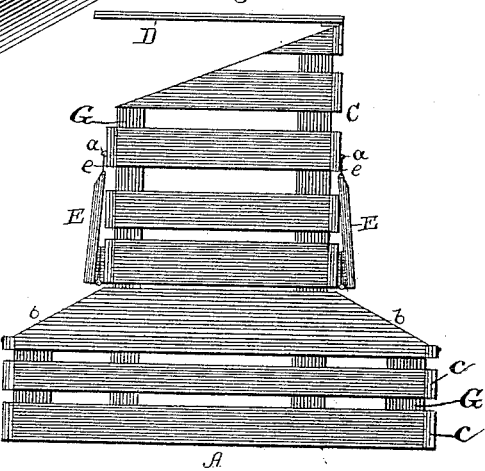
Figure 4:
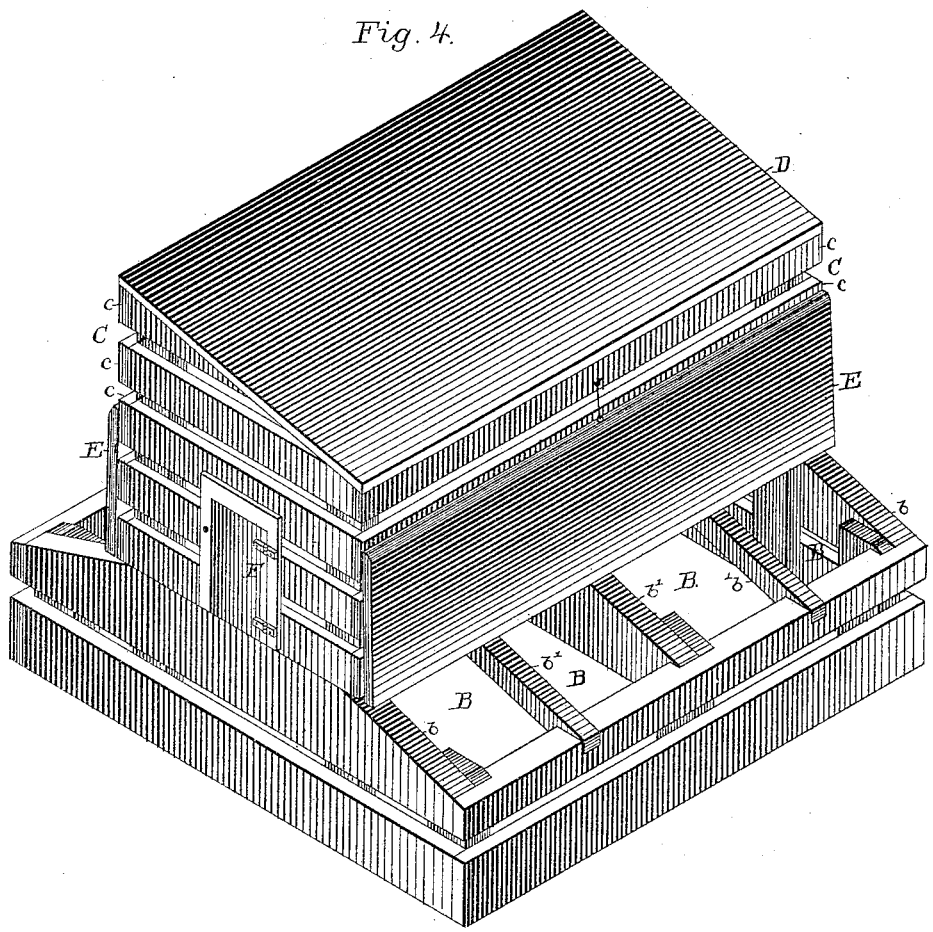

Figure 1 is a perspective view of this device. Fig. 2 is an end elevation with the lids of the manger and the roof raised; Fig. 3, a like elevation, the roof and lids down. Fig. 4 is a view in perspective of the device with the manger-cover raised and showing the internal structure.

This device belongs to that class called "feed-racks," and particularly to that division of that class in which hay or straw is to be placed, and which devices are to be used in the feed-yard and not under cover; and the novelty consists in the construction and combination of the several parts, all as will now be fully set out and explained.

In the accompanying drawings, A denotes the base, generally rectangular in shape, entirely open on the bottom and sloping at the upper edges $b$ of the mangers or feeding-places B, which are situated on each side of the rack or receptacle part C. This rack or receptacle thus comes centrally and lengthwise over the base A, and like the base is made of slats and of the vertical posts or pieces G.

The feed-receptacle portion of the rack is designed to be filled with any rough feed, such as hay, straw, &c., and the feed thus is conveyed by gravity to the base part of the rack. To protect the straw or hay in the rack from dust or rain, there is hinged at its upper edge the lid or cover D, preferably in two parts, which is easily raised when the rack or receptacle is to be filled. The cattle or horses can easily get at this feed through the open sloping edges B, when the hinged lids E are raised, and kept up by the hooks $e$, each engaging an eye $a$ on the rack portion, or kept open in any other way.

The manger or eating part of the device is subdivided by slats $b'$ or partitions or otherwise, so that several animals may feed at any one of several places on each side of the rack. This construction will also prevent horses or other stock from putting their noses down under the feed and throwing it out on the ground. The top slat of the base or manger should be made of large size, also the bottom one of the main racks to prevent the stock from breaking them.

By the door F in the side of the feed-receptacle or upper part easy access can be had to the hay or straw inside to pull it down if it becomes lodged, or for any occasion that may render it necessary to get at the inside of the device.

This device is admirable for farm use, because it will hold a large quantity of hay or straw and keep the manger full, which admits of the stock eating with their heads in a natural position, holding their heads over the manger so that all the droppings from their mouths will go back into the manger and prevent waste, no seed or other trash dropping into their eyes, as in the case where the hay is pulled out between slats.

It is not necessary that the precise form now shown shall be used in making this rack, for in proportions and shape several changes can be made without departing from the scope of my invention.

I am aware that it is not new to provide a rack with open places at its lower end, where animals may feed, and that troughs for feeding swine have been made with an upper receptacle or chute wherein the food is placed, and that this food is eaten at the open spaces in the receptacle at the bottom.

I am aware of the portable sheep-pen, as shown in Patent No. 74,411, to O. P. Norris, and disclaim that device and its structure, because that is merely a pen for housing the sheep, which are fed from the outside, and has a removable roof, and is hauled about on runners. My device, on the other hand, is adapted to protect the hay and grain and to allow the stock to feed upon it from the outside of the casing, and its door allows inspection of the interior of the rack, but not ingress of animals, and, as above described, is in many other details different from that, as well as all other patents that I know about.

What I consider new, and desire to secure by Letters Patent, is—

In a portable feed-rack, the large open-bottom base A, composed of slats and corner-posts, as described, and provided on each side with mangers B, each separated from the other by slats $b'$, the mangers on each side covered by a lid E, hinged to the receptacle C and adapted to be held open by a hook, and the receptacle C, placed centrally over the base and composed of slats of which the lowest is the largest, said slats being secured to corner-posts, its top covered with the hinged and slanting lids D, and having in its side a door F, the several parts constructed, arranged, and all combined in the manner and for the purposes set forth.

In testimony whereof I affix my signature in presence of two witnesses.

JOHN C. HURST.

Witnesses:
 HENRY F. MEYER,
 M. B. SMYTH.